J. W. BRASSINGTON.
EXPANSIBLE ROPE SHEAVE.
APPLICATION FILED JAN. 18, 1915.
1,159,165.
Patented Nov. 2, 1915.
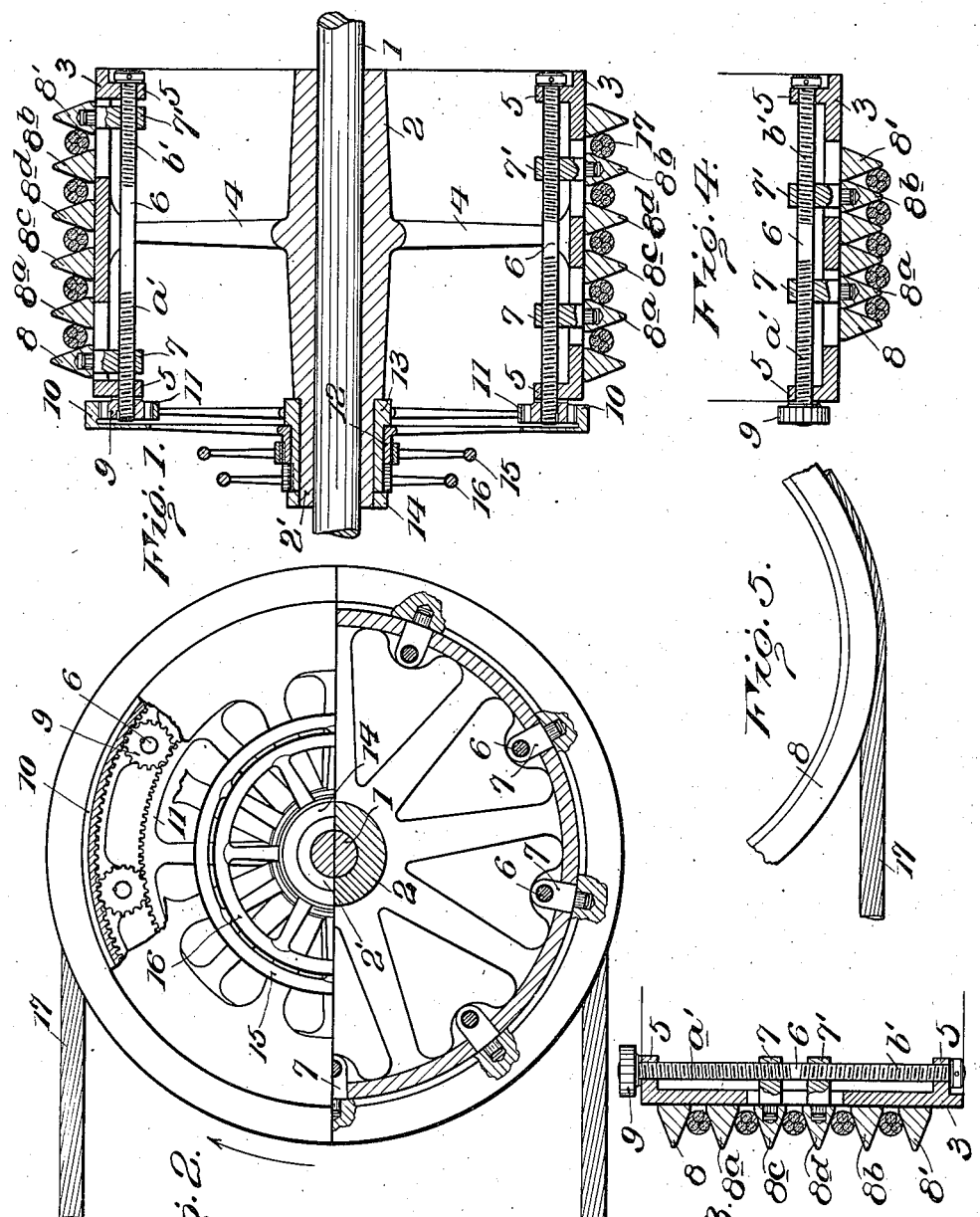

UNITED STATES PATENT OFFICE.

JOHN W. BRASSINGTON, OF WILMINGTON, DELAWARE.

EXPANSIBLE ROPE-SHEAVE.

1,159,165.  Specification of Letters Patent.  Patented Nov. 2, 1915.

Application filed January 18, 1915. Serial No. 2,892.

*To all whom it may concern:*

Be it known that I, JOHN W. BRASSINGTON, a citizen of the United States, and a resident of Wilmington, Delaware, have invented a new and useful Improvement in Expansible Rope-Sheaves, which invention is fully set forth in the following specification.

This invention relates to pulleys, and more particularly to expansible pulleys for varying the speed of machinery, and has for its object to provide a device of the class referred to which will be capable of utilizing the power of the pulley when revolving to effect the operation of the pulley-expansion means, for the purpose of altering the effective diameter of the pulley, and which will also enable this operation to be accomplished when the pulley is not rotating.

Briefly stated, the invention consists in providing a pulley with a plurality of circumferential or annular adjustable ribs spaced to form grooves for ropes or other power-transmitting elements, each rib preferably presenting wedge-shaped bearing faces for the rope. In the preferred construction, each rib engages one or more screw-threaded adjusting rods or shafts arranged parallel with the axis of the pulley, and means are provided, preferably on the hub of the pulley, for effecting simultaneous rotation of the adjusting rods in either a right or left-hand direction for moving the ribs to or from each other. This means preferably consists of a pair of brake wheels which normally revolve with the pulley, and which have gearing connections with the adjusting rods or shafts which operate the ribs. When power is applied to either brake wheel to stop or retard its rotation, the continued rotation of the pulley causes the threaded rods to rotate either in a right-hand or left-hand direction to move the ribs on the rim to or from each other, depending on which brake wheel is stopped or retarded. The effective diameter of the pulley can also be altered when the pulley is not rotating, by holding one of the brake wheels and rotating the other, or by simultaneously rotating the brake wheels in opposite directions. In order to minimize the number of adjusting rods or shafts, each rod or shaft is preferably provided with a right-hand screw-thread and a left-hand screw-thread which engage separate ribs, thereby enabling, for example, two or more ribs to be moved at the same time toward or from each other by the rotation of a single rod or shaft.

The invention will be better understood by reference to the accompanying drawings, illustrating one expression of the inventive idea, and in which—

Figure 1 is a central, longitudinal section of a pulley provided with my improvement; Fig. 2 is an end elevation of Fig. 1, with parts in broken section; and Figs. 3, 4 and 5 are detail views.

Referring to the drawings, wherein like reference numerals indicate like parts, 1 is a shaft on which is mounted a pulley hub 2 which supports a rim frame 3 by means of spokes 4. Revolubly mounted in bearings 5, on the interior of the rim frame 3, is a plurality of rods or shafts 6 which are circumferentially located about the axis of the pulley, preferably at equal angular distances. Each rod or shaft is preferably provided with two sets of screw-threads, a right-hand screw-thread $a'$ and a left-hand screw-thread $b'$, for engaging correspondingly screw-threaded members 7, 7', to which are secured in any suitable manner ribs 8, 8', respectively, said ribs preferably having wedge-shaped faces. In the device illustrated, six such ribs are shown in three pairs, each pair having a screw-threaded connection with three of the adjusting rods 6 arranged 120° apart. Keyed or otherwise secured to the end of each rod 6 is a pinion 9. Each pinion meshes with a pair of circular racks 10 and 11 concentrically arranged, the rack 10 being supported on a collar 12 and the rack 11 on a collar 13, which collars are revolubly mounted on a reduced end portion 2' of the hub 2 and held thereon by suitable means, as locking collar 14. The collar 12, which is connected to the rack 10, is provided with a brake wheel 15 which is preferably keyed thereon, and collar 13, which is connected with circular rack 11, is similarly provided with a brake wheel 16.

In Fig. 1, the parts of the pulley are shown in the position which they occupy when the pulley has its shortest diameter for the rope bight 17, outside ribs 8, 8' being shown connected with one of the rods 6, and the intermediate pair of ribs $8^a$ and $8^b$ being shown opposite the rods 8, 8' and connected to another one of the rods 6. In Fig. 3, an adjustment of the parts similar to that shown in Fig. 1 is illustrated, but in this figure the innermost pair of ribs 8^c and 8^d are shown connected to one of the screw-threaded rods 6. In Fig. 4, the parts are shown in the position which they occupy when the pulley has its greatest effective diameter, that is to say, the wedge-shaped ribs are closest together. In this figure, the ribs 8^a and 8^b are shown in engagement with one of the rods or shafts 6.

While in the device illustrated six ribs are employed, each of which is positively moved by the rotation of the rods or shafts 6, it is to be understood that any desired number of ribs may be provided on the rim of the pulley, said ribs being simultaneously adjusted to or from each other in accordance with the principles of the invention. Further, the expansible pulley of the present invention may be either the driven member or the driving member, and in either case the adjustments to alter the effective diameter of the pulley may be made while the pulley is rotating, in which event the power necessary for effecting the adjustments is derived from the pulley itself. It is pointed out that the spacing of the ribs with wedge-shaped faces toward and from each other varies the width of the rope grooves and the diameters of the rope bights for the same rope, and also permits ropes of different diameters to be used on the same pulley.

The operation of the device is as follows:—If we assume that power is being applied to the pulley either through the rope or through the shaft on which the pulley is mounted, and that the pulley is rotating in the direction of the arrow, Fig. 2, and it is desired to increase the diameter of the bight of the rope running in the pulley grooves, this is effected by retarding or stopping the rotation of circular rack 10 by means of brake wheel 15. Pinions 9 thereupon commence rotating in a counter-clockwise direction under the driving power of the pulley, and hence the several rods or shafts 6 are rotated in a counter-clockwise direction. This causes the ribs 8, 8^a and 8^c to be fed toward the center of the pulley by means of screw-threads a', and the ribs 8', 8^b and 8^d to be fed toward the center of the pulley by means of the screw-threads b'. If the maximum effective diameter of the pulley is desired, the ribs are moved to the position shown in Fig. 4, the ropes under this condition of things having been forced the maximum distance away from the center of the pulley. To reduce the effective diameter of the pulley, the rotation of wheel 16 is retarded or stopped, whereupon the pinions 9 are rotated in a clockwise direction and the ribs are separated.

The adjustment of the ribs may also be effected when the pulley is not rotating. In this event, the two brake wheels 15 and 16 may be rotated in opposite directions, or one may be held stationary while the other is rotated. The power for moving the ribs in this case will be applied at the brake wheel which is moved. Under normal working conditions, when adjustments are not being made, the brake mechanism locks the adjusting rods or shafts 6 from rotation and securely holds the ribs to their work, this locking action being due to the meshing of the pinions 9 with the circular racks 10 and 11.

While, for the purpose of illustration, one expression of the inventive idea has been shown and described in detail, it is to be understood that the invention is not limited to the embodiment shown, but that the inventive idea is susceptible of various expressions within the limits of the appended claims.

What is claimed is:—

1. An expansible pulley comprising a plurality of annular ribs with inclined faces, said ribs being uniformly spaced to form a plurality of rope grooves and being movably mounted on the rim of the pulley, and means revoluble with the pulley for adjusting said ribs to vary the width of said grooves while the pulley is rotating.

2. An expansible pulley comprising a plurality of annular ribs spaced to form rope grooves on the rim of the pulley, one or more rods mounted on the pulley and having threaded engagement with said ribs for adjusting their position to and from each other, and means for rotating said rod or rods.

3. An expansible pulley comprising a rim having a plurality of adjustable ribs spaced to form rope grooves, rods having threaded engagement with said ribs, pinions on said rods, and concentric racks loose on the hub of said pulley engaging said pinions, and means for braking either rack to rotate said rods and adjust said ribs to or from each other.

4. An expansible pulley comprising a plurality of wedge-shaped annular ribs uniformly spaced to form a plurality of rope grooves and movably mounted on the rim of the pulley, and means for effecting the adjustment of said ribs to vary the width of said grooves and the diameter of said pulley.

5. An expansible pulley comprising a plurality of ribs uniformly spaced apart to form a plurality of rope grooves and movably mounted on the rim of the pulley, and means for effecting the adjustment of said ribs to vary the width of said grooves.

6. An expansible pulley comprising a plurality of ribs uniformly spaced to form a plurality of rope grooves on the rim of the pulley, means for adjustably supporting said ribs, and brake-controlled means for effecting the operation of said supporting means by the power of the pulley, to vary the positions of said ribs.

7. In combination, a pulley provided with a plurality of movable ribs having dihedral faces and uniformly spaced to form a plurality of rope grooves, shafts having threaded engagement with said ribs, and brake means operatively connected with said shafts normally restraining the same from rotating and adapted when friction is applied to said brake means to cause the pulley to rotate said shafts and adjust said ribs.

8. In combination, a pulley provided with a plurality of movable annular ribs having dihedral faces and uniformly spaced to form a plurality of rope grooves, rods having threaded engagement with said ribs, and brake means comprising brake wheels revoluble with said pulley and having gear engagement with each of said rods which are normally restrained from rotation by said brake means but are actuated by said pulley when friction is applied to one of said brake wheels.

9. In combination, a pulley provided with a plurality of movable ribs spaced to form rope grooves, rods having threaded engagement with said ribs, a pinion mounted on each rod, two concentrically-arranged racks meshing with said pinions normally rotating with the pulley, and means for retarding or stopping the movement of one of said racks to effect rotation of said pinions.

10. In combination, a pulley provided with a plurality of movable ribs spaced to form rope grooves, rods having threaded engagement with said ribs, each rod having a right-hand screw-thread and a left-hand screw-thread, a pinion mounted on each rod, two concentrically-arranged racks meshing with said pinions normally rotating with the pulley, and means for retarding or stopping the movement of one of said racks to effect rotation of said pinions.

11. An expansible pulley comprising a rim having a plurality of adjustable annular ribs with inclined faces to form a plurality of rope grooves, threaded rods engaging said ribs in pairs, and means engaging said rods to simultaneously rotate the latter to uniformly vary the width of the rope grooves.

In testimony whereof I have signed this specification in the presence of two subscribing witnesses.

JOHN W. BRASSINGTON.

Witnesses:
EDWARD MARTIN,
H. J. FEENEY.